United States Patent
Mori (12) United States Patent
(10) Patent No.: US 8,294,548 B2
(45) Date of Patent: Oct. 23, 2012

(54) SYSTEM AND METHOD FOR USING SOUND TO DIFFERENTIATE KEYPRESSES

(75) Inventor: Robert F. Mori, Palo Alto, CA (US)

(73) Assignee: Oracle America, Inc., Redwood City, CA (US)

(*) Notice: Subject to any disclaimer, the term of this patent is extended or adjusted under 35 U.S.C. 154(b) by 373 days.

(21) Appl. No.: 12/204,587

(22) Filed: Sep. 4, 2008

(65) Prior Publication Data
US 2010/0052877 A1    Mar. 4, 2010

(51) Int. Cl.
G09B 21/00    (2006.01)

(52) U.S. Cl. ............... 340/4.14; 340/4.1; 340/384.5; 340/392.1; 345/173; 341/23

(58) Field of Classification Search ........... 340/384.5, 340/392.1; 345/173, 436, 556.1; 341/23; 84/470, 653, 662, 707
See application file for complete search history.

(56) References Cited

U.S. PATENT DOCUMENTS

| 4,282,404 | A  | * | 8/1981  | Tanimoto et al. ........... 704/258 |
| 5,700,097 | A  | * | 12/1997 | Kuhlenschmidt .......... 400/487 |
| 6,882,859 | B1 | * | 4/2005  | Rao et al. .............. 455/550.1 |
| 7,034,806 | B2 | * | 4/2006  | Nakagawa ............... 345/168 |
| 7,382,233 | B2 | * | 6/2008  | Steinetz et al. ............ 340/392.1 |
| 2002/0109614 | A1 |   | 8/2002 | Kim |
| 2003/0197687 | A1 | * | 10/2003 | Shetter ................. 345/173 |
| 2003/0201916 | A1 | * | 10/2003 | Nathan ................. 341/22 |
| 2008/0125169 | A1 | * | 5/2008  | Kozak .................. 455/556.1 |

FOREIGN PATENT DOCUMENTS

| JP | 57048133 A | 3/1982 |
| JP | 58125133 A | 7/1983 |
| JP | 58219630 A | 12/1983 |
| JP | 59079337 A | 5/1984 |

OTHER PUBLICATIONS

International Search Report for PCT/US2009/055858 mailed Apr. 23, 2010, 2 pages.

* cited by examiner

*Primary Examiner* — Albert Wong
*Assistant Examiner* — Peter Mehravari
(74) *Attorney, Agent, or Firm* — Osha •Liang LLP (57) ABSTRACT

A method for associating sounds with different keypresses, involving receiving an input of a first keypress from a keyboard including a plurality of keys, wherein the keyboard is associated with a computing device, determining whether a key corresponding to the first keypress is one of a plurality of significant elements, wherein the plurality of significant elements is a subset of the plurality of keys, determining a first sound event associated with the key, when the key is one of the plurality of significant elements, and outputting a first sound associated with the first sound event.

13 Claims, 4 Drawing Sheets

SYSTEM AND METHOD FOR USING SOUND TO DIFFERENTIATE KEYPRESSES

BACKGROUND

Typically, small handheld computing devices play a sound when a key is pressed by a user to indicate that a key has been pressed. For example, on personal digital assistants and mobile phones, pressing any key results in a sound that is played through the speakers of the computing device. In addition, touch-tone telephones often associate a different sound with each number, from 0-9, using Dual Tone Multiple Frequencies (DTMF) sounds.

Generally, computing devices with which a fully functional keyboard is associated, assign a single sound to all the keys on the keyboard. This sound scheme is also common in computing devices that include a virtual keyboard. The sound is used simply to indicate that a key was pressed. To see what was actually typed/pressed, a user must rely on the visual display of the computing device. With small computing devices that include a touch screen, it is easy to press the wrong key because the keys are typically physically close together. Thus, to detect a typing error, the user uses the visual display to review the inputted text and correct detected errors. Alternatively, some computing devices include text auto-correction functionality, in which case typing errors are often automatically corrected by the computing device.

SUMMARY

In general, in one aspect, the invention relates to a method for associating sounds with different keypresses, comprising receiving an input of a first keypress from a keyboard comprising a plurality of keys, wherein the keyboard is associated with a computing device, determining whether a key corresponding to the first keypress is one of a plurality of significant elements, wherein the plurality of significant elements is a subset of the plurality of keys, determining a first sound event associated with the key, when the key is one of the plurality of significant elements, and outputting a first sound associated with the first sound event.

In general, in one aspect, the invention relates to a computer readable medium for associating sounds with different keypresses comprising instructions to receive an input of a first keypress from a keyboard comprising a plurality of keys, wherein the keyboard is associated with a computing device, determine whether a key corresponding to the first keypress is one of a plurality of significant elements, wherein the plurality of significant elements is a subset of the plurality of keys, determine a first sound event associated with the key, when the first key is one of the plurality of significant elements, and output a first sound associated with the first sound event.

In general, in one aspect, the invention relates to a computing device, comprising a processor, a keyboard operatively connected to the computing device, a speaker configured to output sounds, and a memory comprising software instructions, which when executed by the processor, enable the computing device to receive an input of a first keypress from the keyboard comprising a plurality of keys, determine whether a key corresponding to the first keypress is one of a plurality of significant elements, wherein the plurality of significant elements is a subset of the plurality of keys, determine a first sound event associated with the key, when the key is one of the plurality of significant elements, and output a first sound associated with the first sound event by the speaker.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for using sound events to differentiate between keypresses when typing a message on a computing device. More specifically, embodiments of the invention relate to a system and method for outputting a different sound for various significant element keys on a computing device. The sound may be used by the user to detect an error when typing a message on the computing device.

Figure 1:
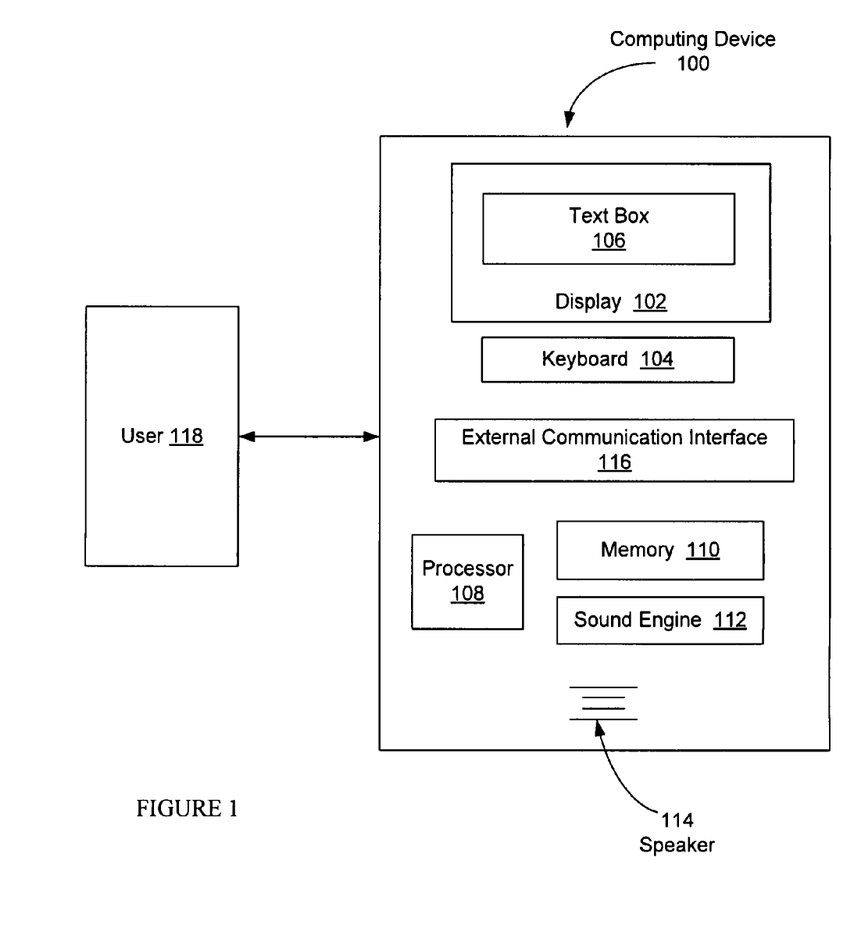
FIG. 1 shows a system in accordance with one or more embodiments of the invention.

FIG. 1 shows a computing device in accordance with one or more embodiments of the invention. As shown in FIG. 1, the computing device (100) includes output means, such as a display (102), an input means e.g., a keyboard (104), a processor (108), associated memory (110), a sound engine (112), an external communication device (116), and numerous other elements and functionalities typical of today's computing devices (not shown). Those skilled in the art will appreciate that the input and output means may take other forms, now known (e.g., a virtual keyboard) or later developed. The computing device (100) may be a computer system, a laptop, a media device (i.e., a portable television or DVD player, etc), a gaming device, a mobile phone (including a smart phone), a personal digital assistant, or any other suitable wired or wireless computing device.

The display (102) may be a liquid crystal display (LCD) or any other type of suitable user interface. The display (102) includes a text box (106) for displaying text on the computing device. That is, the display (102) is an interface configured to display a text box (106). The text box (106) is a text input area for composing messages on the computing device, such as electronic mail messages, short messaging service (SMS) messages or text messages, etc. Those skilled in the art will appreciate that the text box (106) may also be used to display text for a user of the computing device, such as notifications/alerts, a greeting message, the current date/time, etc.

Text is input into the computing device using a keyboard (104) associated with the computing device (104). The inputted text is subsequently displayed in the text box (106). The keyboard may be a wired keyboard, a wireless keyboard, a virtual keyboard, a keypad, or any other type of suitable input device that includes keys that are pressed to input data. The keyboard may be a full keyboard with all standard keys included, or may be a partially equipped keyboard that includes a subset of the keys typically included on a full keyboard. Further, the keyboard may be a QWERTY, English-based keyboard, a modified version of the QWERTY keyboard for international use (i.e., an English-international layout), or an extended keyboard with extended characters (i.e., an English-extended layout). Those skilled in the art will appreciate that the invention may also be implemented with foreign-language keyboards.

The computing device includes a processor (108) for executing applications and software instructions configured to perform various functionalities, and memory (110) for storing program instructions and application data. Software instructions to perform embodiments of the invention may be stored on any tangible computer readable medium such as a compact disc (CD), a diskette, a tape, a memory stick such as a jump drive or a flash memory drive, or any other computer or machine readable storage device that can be read and executed by the processor (108) of the computing device.

The memory (110) may be flash memory, a hard disk drive (HDD), persistent storage, random access memory (RAM), read-only memory (ROM), any other type of suitable storage space, or any combination thereof. In one or more embodiments of the invention, the memory (110) is configured to store a data structure that maps sound events to one or more keys on the keyboard of the computing device (discussed in detail below). In addition, the memory (110) may be configured to store the aforementioned software instructions.

The external communication interface (116) may be an antenna, a serial port, a parallel port, a universal serial bus (USB) interface, or any type of network interface connection, such as Bluetooth® (Bluetooth is a registered trademark of Bluetooth SIG, Inc.), infrared signal, etc. Further, the external communication interface may also support Global System for Mobile (GSM) communications, and 3G and/or 4G standards for mobile phone communication. In one or more embodiments of the invention, the computing device (100) may be connected to a local area network (LAN) or a wide area network (e.g., the Internet) (not shown) via the external communication interface (116). Further, the external communication interface (116) may support both wired and wireless interfaces.

In one or more embodiments of the invention, the computing device includes a sound engine (112). The sound engine (112) is a sound generating module that is configured to capture sound events associated with one or more keypresses of corresponding key(s) on the keyboard of the computing device. The sound engine (112) is also configured to playback sounds associated with captured sound events.

Continuing with FIG. 1, the sound engine (112) is configured to associate a sound event with significant element(s) on the keyboard of the computing device. Further, the sound engine (112) is configured to determine which sound event is associated with a key corresponding to a keypress of a significant element. Although not shown, the sound engine (112) may be associated with a data structure, such as a look-up table, an array, a link list, etc., stored in memory (110) for determining the sound event that is associated with a keypress of a significant element. In one or more embodiments of the invention, each sound event is associated with a unique sound. The sound corresponding to each sound event, once determined by the sound engine (112), is output via a speaker (114) on the computing device.

The computing device (100) is typically associated with a user (118) using the computing device (100). For example, the user may be an individual, a company, an organization, a group of individuals, or another computing device. In one or more embodiments of the invention, the user (118) is an individual consumer that uses the computing device (100) as a personal electronic device.

Figure 2:
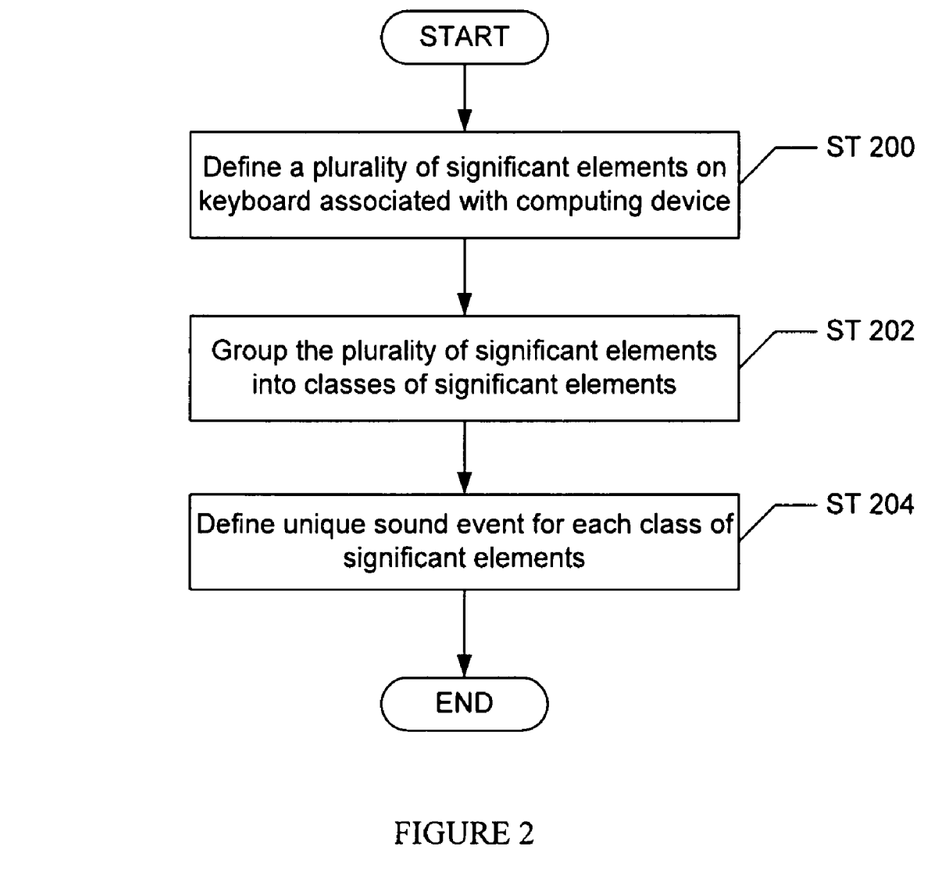
FIGS. 2-4 show flow charts in accordance with one or more embodiments of the invention.

FIG. 2 shows a flow chart for setting up different sounds associated with particular keys of a keyboard associated with a computing device in accordance with one or more embodiments of the invention. In one or more embodiments of the invention, one or more of the steps described below may be omitted, repeated, and/or performed in a different order. Accordingly, the specific arrangement of steps shown in FIG. 2 should not be construed as limiting the scope of the invention.

Initially, a plurality of significant elements are defined (ST 200). In one or more embodiments of the invention, significant elements are a subset of keys on the keyboard of the computing device. That is, the plurality of significant elements are a number of keys less than the total number of keys on the keyboard of the computing device. More specifically, significant elements are keys with which a sound event is associated. Said another way, the computing device associates a sound event with all keys that are significant elements.

For example, significant elements on a full keyboard associated with a computing device may be the backspace key, the delete key, the enter key, the spacebar, the shift key, and the caps lock key. Alternatively, in one or more embodiments of the invention, vowel keys (as opposed to consonant keys), number keys, and/or symbol keys (e.g., !, #, &, *, etc.) on a keyboard may be significant elements. Those skilled in the art will appreciate that any subset of key(s) on a keyboard associated with a computing device may be classified as significant elements.

Continuing with FIG. 2, the significant elements are grouped into classes of significant elements (ST 202). A class of significant elements may include one or more, but not all, significant elements. Thus, each class of significant elements includes a subset of the keys defined as significant elements, where the subset may be as few as only one significant element. Further, a class of significant elements that includes more than one significant element may include different significant elements with similar functions or completely distinct significant elements (with respect to function) that are grouped together.

In ST 204, a unique sound event for each class of significant elements is defined (ST 204). In one or more embodiments of the invention, each significant element in a class of significant elements is associated with the same sound event. In one or more embodiments of the invention, each sound event corresponds to a sound that is played through the speaker of the computing device. A sound event is defined from the system perspective as the capture of a sound associated with a class of significant elements. Said another way, the association of a sound with a class of significant elements is stored by the system as a sound event. Those skilled in the art will appreciate that only keys defined as significant elements are associated with a sound event, and keys that are not significant elements are not associated with a sound event. Further, those skilled in the art will appreciate that sound events defined for different keypresses may be played using any audio or media file that can be stored in memory.

Using the method described above in FIG. 2, a developer/programmer could set up the computing device to include a variety of different classes of significant elements. For example, a first class of significant elements may include the delete key and the backspace key. In this class of significant elements, both included significant elements perform a similar function (i.e., they both remove a typed character). Similarly, a second class of significant elements may include the caps lock key and the shift key. In the aforementioned examples, the delete key and the backspace key would be associated with a first sound event. That is, both the delete key and the backspace key are associated with the same sound event. The caps lock key and the shift key would be associated with a second sound event. Further, each of the first sound event and the second sound event would be unique. Alternatively, each of the four aforementioned significant elements may be grouped into a separate class, with each class including only that one significant element. In this case, each of the delete key, the backspace key, the caps lock key, and the shift key would be associated with a unique sound event. In another embodiment of the invention, a class of significant elements may group unrelated keys together, such as the shift key and the delete key. Further examples include a class of significant elements that includes all symbol keys, all capital letters, all numbers, only the insert key, only the enter key, etc. Those skilled in the art will appreciate that the aforementioned embodiments are merely examples, and are not meant to limit the invention in any way.

Figure 3:
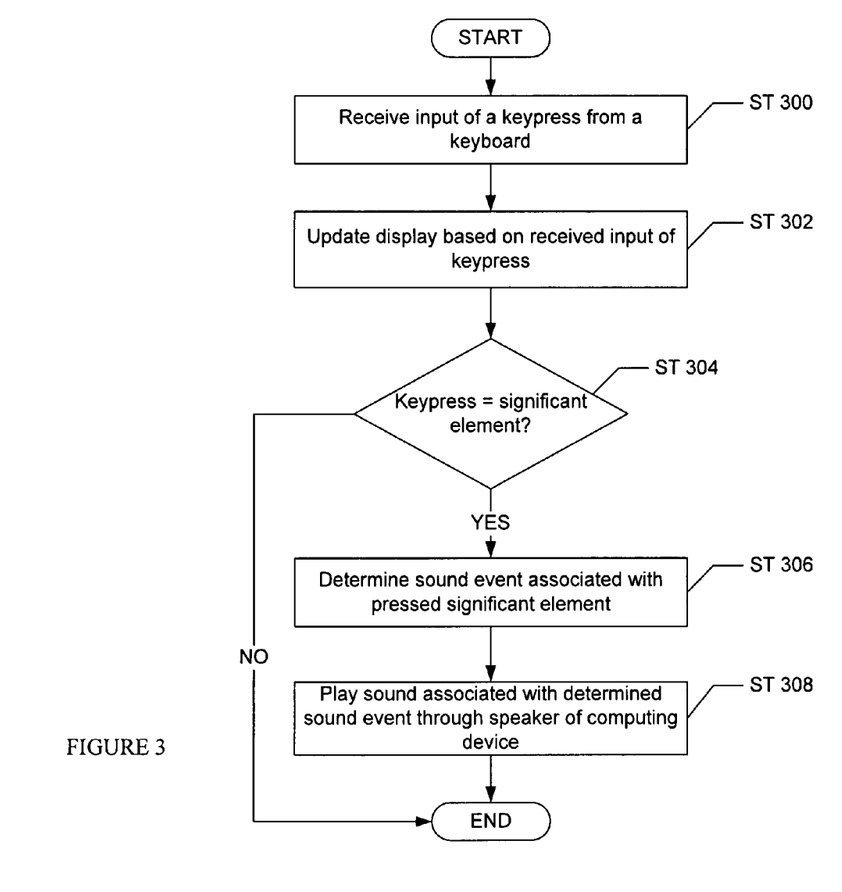

FIG. 3 shows a flow chart for outputting sounds associated with different keypresses in accordance with one or more embodiments of the invention. In one or more embodiments of the invention, one or more of the steps described below may be omitted, repeated, and/or performed in a different order. Accordingly, the specific arrangement of steps shown in FIG. 3 should not be construed as limiting the scope of the invention.

Initially, an input of a keypress from a keyboard is received by the computing device (ST 300). Subsequently, the display on the computing device is updated to reflect the received input of the keypress (ST 302). At this stage, a determination is made by the system (i.e., the computing device) as to whether the key associated with the received input of the keypress is defined as a significant element (ST 304). For example, consider the scenario in which significant elements are defined as all symbol keys. In this case, when a keypress input is received, the system determines whether the keypress corresponds to a symbol key. If the input keypress corresponds to a symbol key, then the key associated with the keypress is a significant element key. Otherwise, the keypress does not correspond to a significant element key, and the process ends.

When the input keypress corresponds to a significant element key, the system determines the sound event associated with the pressed significant element (ST 306). More specifically, the system may use a look-up table or other type of data structure configured to store a mapping of significant elements to corresponding sound events to determine the sound event associated with the pressed significant element. In ST 308, the system plays the sound associated with the determined sound event through the speaker of the computing device (ST 308).

Those skilled in the art will appreciate that the aforementioned steps may be repeated each time an input keypress is received by the computing device. Thus, each time a keypress is performed by a user using the keyboard associated with the computing device, the computing device determines whether the keypress corresponds to a significant element, and if so, outputs a sound associated with the sound event corresponding to the significant element.

Figure 4:
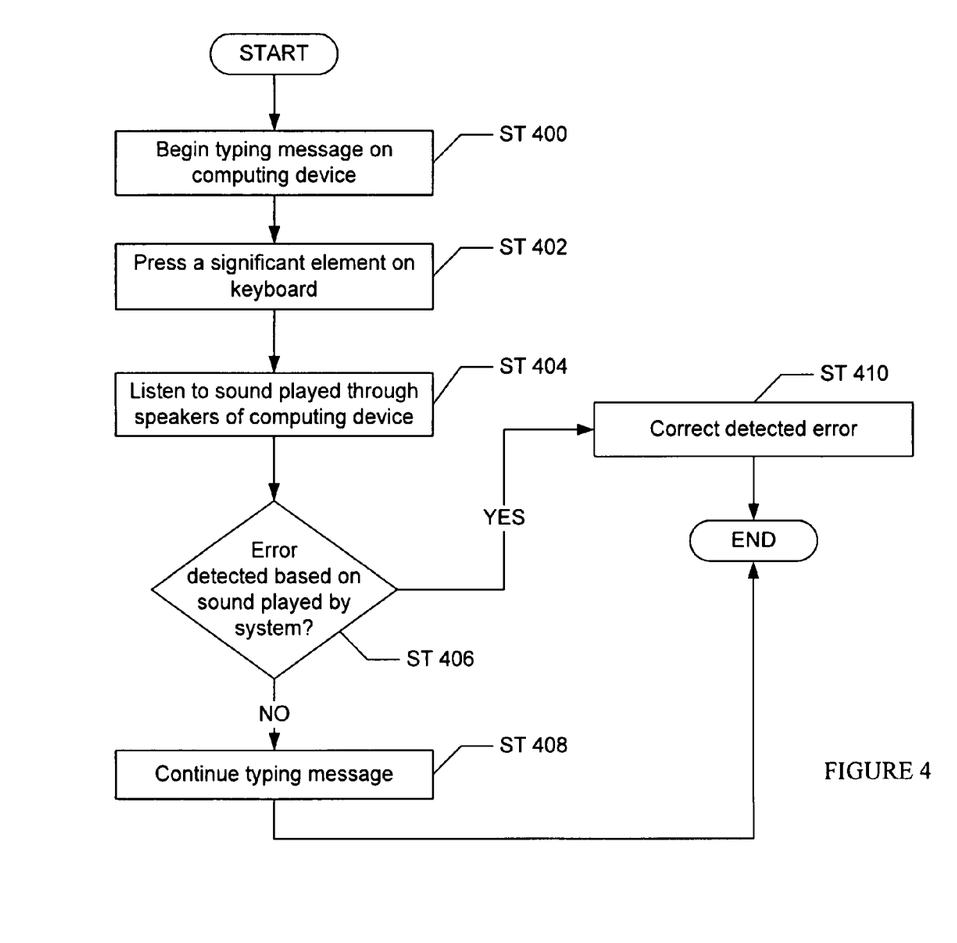

FIG. 4 shows a flow chart for using sound to differentiate keypresses in accordance with one or more embodiments of the invention. Said another way, the method of FIG. 4 is performed by a user using the computing device to compose a message. In one or more embodiments of the invention, one or more of the steps described below may be omitted, repeated, and/or performed in a different order. Accordingly, the specific arrangement of steps shown in FIG. 4 should not be construed as limiting the scope of the invention.

Initially, the user beings typing a message on the computing device (ST 400). As mentioned above, the message may be any type of message that can be composed on a computing device, such as an e-mail message, an SMS message, etc. Subsequently, the user presses a significant element on the keyboard of the computing device (ST 402). Those skilled in the art will appreciate that the user may press a key that is defined as a significant element key without knowing that the pressed key is a significant element key. Thus, the keypress of significant element is performed unbeknownst to the user composing a message on the computing device.

Continuing with FIG. 4, the user hears the sound played through the speaker of the computing device when a significant element key is pressed (ST 404). Subsequently, the user determines whether a typing error has occurred based on the sound that is heard (ST 406). In one or more embodiments of the invention, a user using the computing device to compose a message uses the sound played in response to the keypress of a significant element to determine whether a user error has occurred. If an error is not detected by the user based on the sound played back by the computing device, then the user continues typing the message and the process ends. Alternatively, if the user hears the sound and determines that the keypress of the significant element associated with the sound played back was an error, then the user corrects the detected error (ST 410). Those skilled in the art will appreciate that the steps of FIG. 4 may be repeated for each keypress of a significant element key performed by the user.

Using embodiments of the invention described in FIG. 4, the user can determine whether a user error has occurred without looking at the display to determine whether the user has made a typing error. Thus, the user may be able to focus on the keyboard and avoid breaking the flow of typing a message by using specifically defined audio feedback provided by the computing device to determine whether a user error has occurred. By playing unique sounds associated with different classes of defined significant elements, the system reinforces the user's intention. In other words, embodiments of the invention use key-based events rather than context based events to provide audio feedback to a user using the computing device.

For example, suppose the user using a computing device composes a text message on the computing device. In this case, suppose the computing device has defined the following classes of significant elements: a first class including the delete key and the backspace key, a second class including the enter key, a third class including the caps lock and the shift key, and a fourth class including all symbol keys. In this scenario, the user would hear a unique sound played through the speakers of the computing device when a keypress of a key in each class of significant elements is received. Overtime, the user may readily associate particular unique sounds to each class of significant elements, allowing the user to quickly and efficiently know when a typing error has occurred during the composition of a message on the computing device.

Using the classes of significant keys described above, and assuming the user is using a typical full keyboard, when the user is typing a message and wishes to input the number "2" in the message, the user should not hear a unique sound played by the computing device. However, if, by user error, the shift key is pressed and the user accidentally presses the "2" key, causing the "@" symbol to be input, the user will hear a unique sound associated with the symbol class of significant elements. When the sound associated with the symbol class of significant elements is heard, the user will automatically know that a typing error has occurred. By contrast, if the user wishes to press the "@" key and does not hear any sound, the user will automatically know that the "@" was not pressed. Similarly, if the user does not wish to remove a typed character, but the backspace key is accidentally pressed, the user will heard the unique sound associated with the class of significant elements that includes the backspace and the delete keys, in which case the user will know that a character has been erroneously removed from the message being composed. In this manner, embodiments of the invention help a user detect when an error has been made so that the user can correct the error without having to check whether the display is showing the user's intended keypresses.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for associating sounds with different keypresses, comprising:
    defining a plurality of significant elements on the computing device, wherein each of the significant elements is a particular key of a plurality of keys of a virtual keyboard;
    grouping the plurality of significant elements into:
        a first class significant elements comprising a first distinct subset of the plurality of significant elements having a common function of deleting a character when pressed,
        a second class of significant elements comprising a second distinct subset of the plurality of significant elements consisting of numerical keys and symbol keys,
        a third class of significant elements comprising a third distinct subset of the plurality of significant elements consisting of vowel keys,
        a fourth class of significant elements comprising a fourth distinct subset of the plurality of significant elements consisting of consonant keys, and
        a fifth class of significant elements comprising a fifth distinct subset of the plurality of significant elements consisting of spacing keys;
    associating a first sound event to the first class of significant elements, a second sound event to the second class of significant elements, a third sound event to the third class of significant elements, a fourth sound to the fourth class of significant elements, and a fifth sound to the fifth class of significant elements;
    receiving an input of a first keypress from the virtual keyboard, wherein the virtual keyboard is associated with a computing device;
    determining, when a key corresponding to the first keypress is one of the plurality of significant elements, to which class of the first, second, third, fourth or fifth class of significant elements the key belongs; and
    outputting a first sound associated with the first sound event when the first keypress belongs to the first class of significant elements;
    outputting a second sound associated with the second sound event when the first keypress belongs to the second class of significant elements;
    outputting a third sound associated with the third sound event when the first keypress belongs to the third class of significant elements;
    outputting a fourth sound associated with the fourth sound event when the first keypress belongs to the fourth class of significant elements; and
    outputting a fifth sound associated with the fifth sound keypress event when the first keypress belongs to the fifth class of significant elements, wherein an association between each of a plurality of sound events and each of the classes of significant elements is stored in a data structure on the computing device,
    wherein the first sound provides an auditory signal indicating deletion of a character, the second sound provides an auditory signal indicating insertion of at least one selected from group consisting of a numeral and a symbol, the third sound provides an auditory signal indicating insertion of a vowel character, the fourth sound provides an auditory signal indicating insertion of a consonant character, and the fifth sound provides an auditory signal indication insertion of a space, and
    wherein the user is able to identify a typing error by hearing the auditory signal corresponding to the first keypress.

2. The method of claim 1, wherein the first and second sound are each unique sounds.

3. The method of claim 1, wherein the first sound is output using a speaker associated with the computing device.

4. The method of claim 1, further comprising:
    receiving an input of a second keypress, wherein a key corresponding to the second keypress is a significant element in the second class of significant elements;
    determining the second sound event associated with the second class of significant elements; and
    outputting the second sound associated with the second sound event,
    wherein the first and second sound are each unique sounds.

5. The method of claim 1, further comprising:
    receiving an input of a second keypress, wherein a key corresponding to the second keypress is a significant element in the first class of significant elements;
    determining the first sound event associated with the first class of significant elements; and
    outputting the first sound associated with the first sound event.

6. The method of claim 1, wherein the computing device is one selected from the group consisting of a personal digital assistant, a media device, and a mobile phone.

7. A non-transitory computer readable medium for associating sounds with different keypresses comprising instructions to:
    define a plurality of significant elements on the computing device, wherein each of the significant elements is a particular key of a plurality of keys of a virtual keyboard;
    group the plurality of significant elements into:
        a first class significant elements comprising a first distinct subset of the plurality of significant elements having a common function of deleting a character when pressed,
        a second class of significant elements comprising a second distinct subset of the plurality of significant elements consisting of numerical keys and symbol keys,
        a third class of significant elements comprising a third distinct subset of the plurality of significant elements consisting of vowel keys,
        a fourth class of significant elements comprising a fourth distinct subset of the plurality of significant elements consisting of consonant keys, and
        a fifth class of significant elements comprising a fifth distinct subset of the plurality of significant elements consisting of spacing keys;

associate a first sound event to the first class of significant elements, a second sound event to the second class of significant elements, a third sound event to the third class of significant elements, a fourth sound event to the fourth class of significant elements, and a fifth sound event to the fifth class of significant elements;

receive an input of a first keypress from the virtual keyboard, wherein the virtual keyboard is associated with a computing device;

determine, when a key corresponding to the first keypress is one of the plurality of significant elements, to which class of the first, second, third, fourth, or fifth class of significant elements the key belongs; and output a first sound associated with the first sound event when the first keypress belongs to the first class of significant elements;

output a second sound associated with the second sound event when the first keypress belongs to the second class of significant elements;

output a third sound associated with the third sound event when the first keypress belongs to the third class of significant elements;

output a fourth sound associated with the fourth sound event when the first keypress belongs to the fourth class of significant elements; and output a fifth sound associated with the fifth sound event when the first keypress belongs to the fifth class of significant elements, wherein an association between each of a plurality of sound events and each of the classes of significant elements is stored in a data structure on the computing device, wherein the first sound provides an auditory signal indicating deletion of a character, the second sound provides an auditory signal indicating insertion of at least one selected from a group consisting of a numeral and a symbol, the third sound provides an auditory signal indicating insertion of a vowel character, the fourth sound provides an auditory signal indicating insertion of a consonant character, and the fifth sound provides an auditory signal indication insertion of a space, and wherein the user is able to identify a typing error by hearing the auditory signal corresponding to the first keypress.

8. The non-transitory computer readable medium of claim 7, wherein the first and second sound are each unique sounds.

9. The non-transitory computer readable medium of claim 7, wherein the first sound is output using a speaker associated with the computing device.

10. The non-transitory computer readable medium of claim 7, further comprising instructions to:

receive an input of a second keypress, wherein a key corresponding to the second keypress is a significant element in the second class of significant elements;

determine the second sound event associated with the second class of significant elements; and output the second sound associated with the second sound event, wherein the first and second sound are each unique sounds.

11. The non-transitory computer readable medium of claim 7, further comprising instructions to: receive an input of a second keypress, wherein a key corresponding to the second keypress is a significant element in the first class of significant elements; determine the first sound event associated with the first class of significant elements; and output the first sound associated with the first sound event.

12. The non-transitory computer readable medium of claim 7, wherein the computing device is one selected from the group consisting of a personal digital assistant, a media device, and a mobile phone.

13. A computing device, comprising:

a processor;

a virtual keyboard operatively connected to the computing device;

a speaker configured to output sounds; and a memory comprising software instructions, which when executed by the processor, enable the computing device to:

define a plurality of significant elements on the computing device, wherein each of the significant elements is a particular key of a plurality of keys of a virtual keyboard;

group the plurality of significant elements into:

a first class significant elements comprising a first distinct subset of the plurality of significant elements having a common function of deleting a character when pressed, a second class of significant elements comprising a second distinct subset of the plurality of significant elements consisting of numerical keys and symbol keys, a third class of significant elements comprising a third distinct subset of the plurality of significant elements consisting of vowel keys, a fourth class of significant elements comprising a fourth distinct subset of the plurality of significant elements consisting of consonant keys, and a fifth class of significant elements comprising a fifth distinct subset of the plurality of significant elements consisting of spacing keys;

associate a first sound event to the first class of significant elements, a second sound event to the second class of significant elements, a third sound event to the third class of significant elements, a fourth sound event to the fourth class of significant elements, and a fifth sound event to the fifth class of significant elements;

receive an input of a first keypress from the virtual keyboard, wherein the virtual keyboard is associated with a computing device;

determine, when a key corresponding to the first keypress is one of the plurality of significant elements, to which class of the first, second, third, fourth, or fifth class of significant elements the key belongs; and output a first sound associated with the first sound event when the first keypress belongs to the first class of significant elements;

output a second sound associated with the second sound event when the first keypress belongs to the second class of significant elements;

output a third sound associated with the third sound event when the first keypress belongs to the third class of significant elements;

output a fourth sound associated with the fourth sound event when the first keypress belongs to the fourth class of significant elements; and output a fifth sound associated with the fifth sound event when the first keypress belongs to the fifth class of significant elements, wherein an association between each of a plurality of sound events and each of the classes of significant elements is stored in a data structure on the computing device, wherein the first sound provides an auditory signal indicating deletion of a character, the second sound provides an auditory signal indicating insertion of at least one selected from a group consisting of a numeral and a symbol, the third sound provides an auditory signal indicating insertion of a vowel character, the fourth sound provides an auditory signal indicating insertion of a consonant character, and the fifth sound provides an auditory signal indication insertion of a space, and wherein the user is able to identify a typing error by hearing the auditory signal corresponding to the first keypress.

* * * * *